(12) United States Patent
Luecke et al.

(10) Patent No.: US 8,976,678 B2
(45) Date of Patent: Mar. 10, 2015

(54) MULTIPLE LINE COMMUNICATIONS FOR LOCOMOTIVE CONSIST

(71) Applicant: Electro-Motive Diesel Inc., LaGrange, IL (US)

(72) Inventors: James Robert Luecke, Buckeye, AZ (US); Wayne Rudolph, Lemont, IL (US)

(73) Assignees: Electro-Motive Diesel, Inc., LaGrange, IL (US); Secure Commincation Systems, Inc., Santa Ana, CA (US)

( * ) Notice: Subject to any disclaimer, the term of this patent is extended or adjusted under 35 U.S.C. 154(b) by 166 days.

(21) Appl. No.: 13/690,095

(22) Filed: Nov. 30, 2012

(65) Prior Publication Data
US 2014/0153404 A1 Jun. 5, 2014

(51) Int. Cl.
  H04L 12/24 (2006.01)
  H04L 12/26 (2006.01)
  H04B 3/46 (2006.01)
  H04L 12/40 (2006.01)

(52) U.S. Cl.
  CPC ............... *H04L 43/50* (2013.01); *H04B 3/464* (2013.01); *H04L 12/40* (2013.01); *H04L 2012/40293* (2013.01)
  USPC ............ 370/241; 370/329; 370/338; 455/436

(58) Field of Classification Search
  CPC ... B61L 27/0055; B61L 3/243; B61L 25/021; B61L 25/026; B61L 23/044
  USPC ........ 246/34 R; 370/241, 252, 328–330, 338, 370/400, 401; 701/19, 1; 455/436–444
  See application file for complete search history.

(56) References Cited

U.S. PATENT DOCUMENTS

| | | |
|---|---|---|
| 4,630,117 A | 12/1986 | Parker |
| 6,516,192 B1 | 2/2003 | Spaur et al. |
| 6,639,939 B1 | 10/2003 | Naden et al. |
| 6,640,308 B1 | 10/2003 | Keyghobad et al. |
| 6,810,046 B2 | 10/2004 | Abbas et al. |
| 7,224,993 B2 | 5/2007 | Meyers et al. |
| 7,236,462 B2 | 6/2007 | Davenport et al. |
| 7,705,777 B2 | 4/2010 | Sanderford et al. |

(Continued)

FOREIGN PATENT DOCUMENTS

| | | |
|---|---|---|
| CN | 102275602 | 6/2011 |
| WO | WO 2011149677 | 12/2011 |

(Continued)

*Primary Examiner* — Bob Phunkulh
*Assistant Examiner* — Rose Clark
(74) *Attorney, Agent, or Firm* — Finnegan, Henderson, Farabow, Garrett & Dunner, LLP

(57) ABSTRACT

A method for controlling data communication within a locomotive consist is disclosed. The method may include monitoring an effect of a first interference generated by a first pair of wires on a second pair of wires during a communication. The method may also include monitoring an effect of a second interference generated by the second pair of wires on the first pair of wires during the communication. The method may further include dividing data packets to he sent from the first access point to the second access point such that a first subset of the data packets are designated for the first pair of wires and a second subset of the data packets are designated for the second pair of wires and modifying the first subset of the data packets to reduce the effect of the first interference.

20 Claims, 11 Drawing Sheets

(56) References Cited

U.S. PATENT DOCUMENTS

| | | |
|---|---|---|
| 7,729,329 B2 | 6/2010 | Fujita et al. |
| 2002/0154359 A1 | 10/2002 | Tsuda et al. |
| 2002/0163683 A1 | 11/2002 | Antoniades et al. |
| 2010/0241295 A1 | 9/2010 | Cooper et al. |
| 2011/0093144 A1 | 4/2011 | Goodermuth et al. |
| 2011/0099413 A1 | 4/2011 | Cooper et al. |
| 2011/0270475 A1 | 11/2011 | Brand et al. |
| 2011/0282525 A1 | 11/2011 | Kraeling et al. |
| 2012/0136514 A1 | 5/2012 | Noffsinger et al. |
| 2012/0314332 A1* | 12/2012 | Fries et al. .................. 361/152 |
| 2013/0261856 A1* | 10/2013 | Sharma et al. .................. 701/19 |
| 2013/0284859 A1* | 10/2013 | Polivka et al. ............... 246/34 R |
| 2013/0334373 A1* | 12/2013 | Malone et al. ................ 246/2 R |
| 2014/0129061 A1* | 5/2014 | Cooper et al. .................. 701/19 |

FOREIGN PATENT DOCUMENTS

| | | |
|---|---|---|
| WO | WO2012044386 | 4/2012 |
| WO | WO 2012084365 A1 | 6/2012 |

\* cited by examiner

MULTIPLE LINE COMMUNICATIONS FOR LOCOMOTIVE CONSIST

TECHNICAL FIELD

This disclosure relates generally to data communication in a locomotive consist and, more particularly, to a system and method for sending data within a locomotive consist with reduced interference.

BACKGROUND

Rail transport is commonly used to convey passengers, goods, other materials, etc., from one location to another. To do so, two or more locomotives form a consist to push or pull freight and/or passenger cars along the rails. Locomotives also generally include network components that communicate with each other and facilitate user interaction via one or more wired and/or wireless networks to monitor and/or control the locomotive.

When a plurality of locomotives are connected to each other to form a consist, it may be desirable for the network components within one locomotive to communicate with network components in one or more other locomotives. In certain circumstances, however, environmental factors and/or characteristics of the communication lines connecting the network components may degrade the channel quality of the communication lines, interfering with the proper transmission of these communications. Moreover, if multiple communications are being sent over wires within the communication lines simultaneously, crosstalk may be generated, further degrading the channel. Thus, a system is needed to ensure proper transmission of communication data by reducing these deleterious effects.

U.S. Patent Application Publication No. 2011/0282525 (the '525 patent application) to Kraeling et al. is directed to a system for communicating data on multiple communication lines in a locomotive consist. In particular, the '525 patent application discloses transmitting data within a locomotive consist between two or more locomotives over a plurality of communication lines. The system described by the '525 patent application, however, may not account for factors such a crosstalk on the communication lines when multiple data transmissions occur simultaneously.

The disclosed methods and systems are directed to solving one or more of the problems set forth above and/or other problems of the prior art.

SUMMARY

In one aspect, the present disclosure is directed to a method for controlling data communication within a locomotive consist. The method may include monitoring an effect of a first interference generated by a first pair of wires on a second pair of wires during communication between a first access point and a second access point. The method may also include monitoring an effect of a second interference generated by the second pair of wires on the first pair of wires during the communication between the first access point and the second access point. The method may further include dividing data packets to be sent from the first access point to the second access point such that a first subset of the data packets are designated for the first pair of wires and a second subset of the data packets are designated for the second pair of wires and modifying the first subset of the data packets to reduce the effect of the first interference.

In another aspect, the present disclosure is directed to a system for communicating data in a locomotive consist. The system may include one or more memories for storing instructions and one or more processors configured to execute the instructions. Upon executing the instructions, the processor may monitor an effect of a first interference generated by a first pair of wires on a second pair of wires during communication between a first access point and a second access point. The processor may also monitor an effect of a second interference generated by the second pair of wires on the first pair of wires during the communication between the first access point and the second access point. Moreover, the processor may further divide data packets to be sent from the first access point to the second access point such that a first subset of the data packets are designated for the first pair of wires and a second subset of the data packets are designated for the second pair of wires and modify the first subset of the data packets to reduce the effect of the first interference.

In yet another aspect, the present disclosure is directed to a locomotive consist. The locomotive consist may include a plurality of locomotives, a communications network and a plurality of access points disposed within the locomotives. The plurality of access points may be communicatively coupled to the communications network. The first access point may be configured to monitor an effect of a first interference generated by a first pair of wires on a second pair of wires during communication between a first access point and a second access point. The first access point may also monitor an effect of a second interference generated by the second pair of wires on the first pair of wires during the communication between the first access point and the second access point. The first point may further divide data packets to be sent from the first access point to the second access point such that a first subset of the data packets are designated for the first pair of wires and a second subset of the data packets are designated for the second pair of wires and modify the first subset of the data packets to reduce the effect of the first interference.

DETAILED DESCRIPTION

Figure 1:
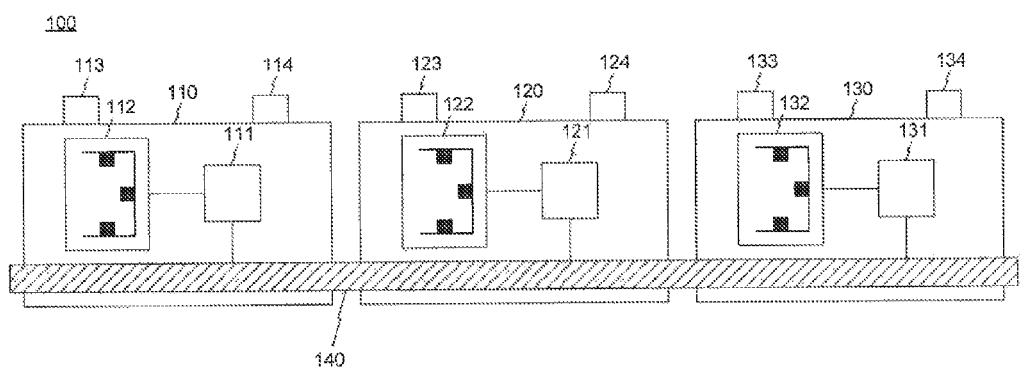
FIG. 1 is a pictorial illustration of an exemplary locomotive consist including an exemplary disclosed communication system.

FIG. 1 is a simplified pictorial illustration of a locomotive consist 100 including a plurality of locomotives 110, 120, and 130 that may be mechanically coupled together. While FIG. 1 shows three locomotives 110, 120, and 130, locomotive consist 100 can comprise any number of two or more locomotives. In locomotive consist 100, locomotives 110, 120, and 130 may be wired together through a multi-unit-bus (MU-bus) 140. MU-bus 140 may be a communication line that includes a plurality of wires to allow data to be communicated between locomotives 110, 120 and 130. For example, in one embodiment, MU-bus 140 may include a bus of twenty-seven individual wires, each capable of carrying a signal. Additionally, locomotives 110, 120, and 130 may communicate wirelessly through wireless routers 113, 114, 123, 124, 133, and 134.

Locomotives 110, 120, and 130 may each include an access point 111, 121, and 131, respectively, Each access point 111, 121, and 131 may be connected to a corresponding wired intra-locomotive network 112, 122, and 132. Wired intra-locomotive networks 112, 122, and 132 may be used to communicate data to and/or receive data from sensors, actuators, and/or other network components used to control locomotives 110, 120, and 130. Access points 111, 121, and 131 may also be communicatively connected to each other through MU-Bus 140 and/or wireless routers 113, 114, 123, 124, 133, and 134. Access points 111, 121, and 131 may interact with each other to control communications across multiple networks, according to the various embodiments described below.

Figure 2:
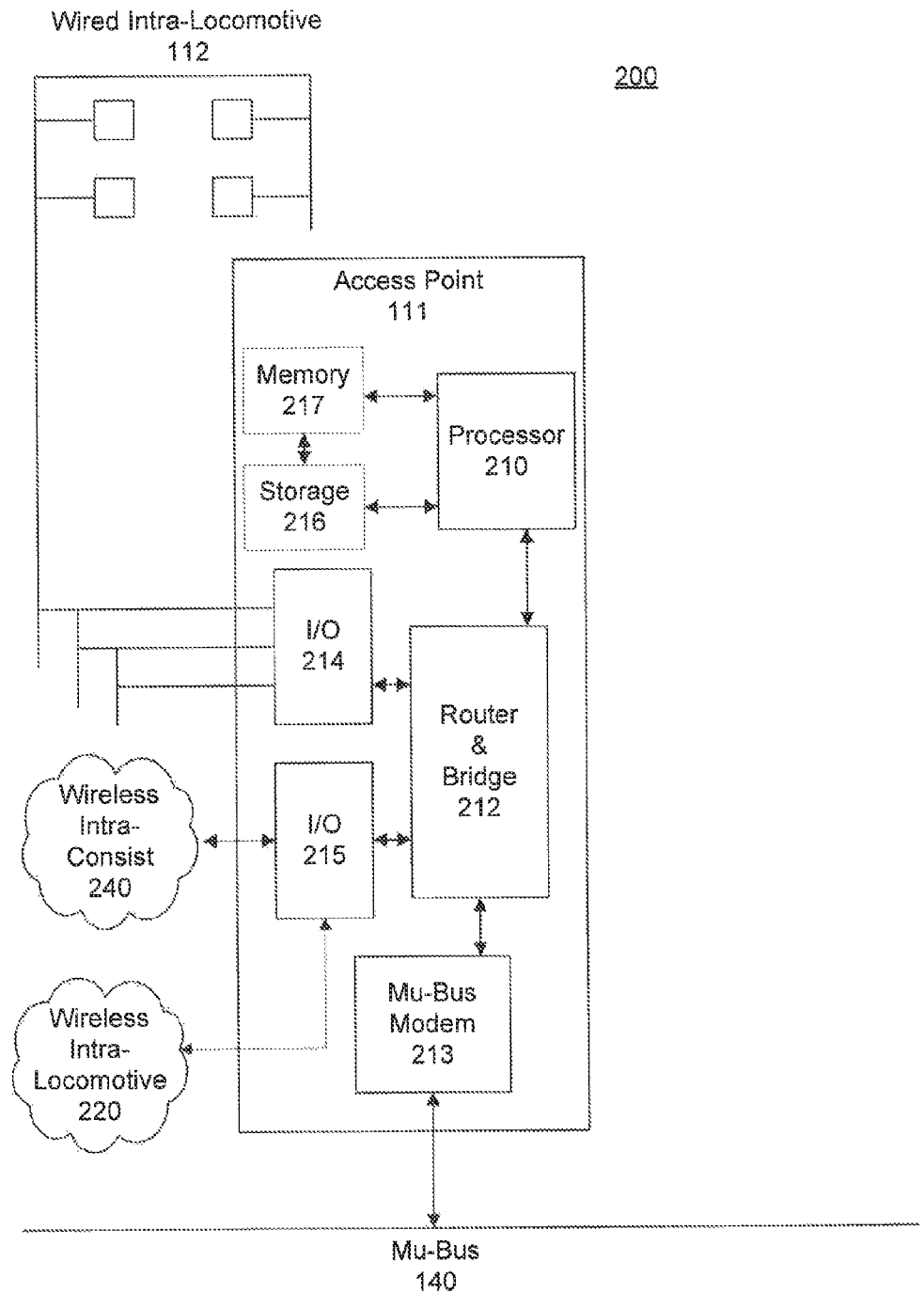
FIG. 2 is a pictorial illustration of an exemplary communication system that may be included in a locomotive of the locomotive consist of FIG. 1.

FIG. 2 is a pictorial illustration of an exemplary communication system 200 that may be included in locomotive 110. While FIG. 2 illustrates the different components of communication system 200 with reference to locomotive 110, those skilled in the art will appreciate that communication systems with identical or similar components may also be included in any other locomotive in locomotive consist 100, such as locomotives 120 and 130, for example.

Communication system 200 may include access point 111 communicatively connected to one or more networks such as wired intra-locomotive network 112, wireless intra-consist network 240, MU-bus 140, and wireless intra-locomotive wireless network 220. Access point 111 may communicate with other components within locomotive 110, such as various sensors, actuators, and/or other network components used to control locomotives, via one or more of wired intra-locomotive network 112 and wireless intra-locomotive network 220. Access point 111 may communicate with other network devices within locomotive consist 100, such as access points 121 and 131 over MU-bus 140. Additionally or alternatively, access point 111 may communicate with network devices within locomotive consist 100 over wireless intra-consist network 240, e.g., via one or more wireless routers, such as wireless routers 113 and 114 shown in FIG. 1. As discussed in greater detail with respect to the embodiments below, access point 111 may communicate with other access points such as access points 121 and 131 to control various aspects of data communication within the locomotive.

Access point 111 may include a processor 210, a router & bridge 212, an MU-bus modem 213, input/output (I/O) ports 214 and 215, a storage 216, and a memory 217. I/O ports 214 and 215 may facilitate communication between access point 111 and one or more other network devices on wired intra-locomotive network 112, wireless intra-consist network 240, and/or wireless intra-locomotive network 220. Likewise, MU-bus modem 213 may facilitate communication between access point 111 and another access point on MU-bus 140. The structure and operation of MU-bus modem 213 is discussed in greater detail below.

Router & bridge 212 may be configured to route data packets between processor 210 and I/O ports 214 and 215 or MU-bus modem 213. For example, when access point 111 receives data packets from I/O ports 214 and/or 215 or from MU-bus modem 213, router & bridge 212 may route the data packets to processor 210.

Processor 210 may include one or more processing devices, such as microprocessors and/or embedded controllers designed and/or manufactured by one or more of Intel™, AMD™, ARM® Freescale™, Texas Instruments, etc., or any other type of processor. Storage 216 may include a volatile or non-volatile, magnetic, semiconductor, tape, optical, removable, nonremovable, or other type of computer-readable medium or computer-readable storage device. Storage 216 may store programs and/or other information that may be used to implement one or more of the processes discussed below. Memory 217 may include one or more storage devices configured to store information used by access point 111 to perform certain functions related to disclosed embodiments.

In one embodiment, memory 217 may include one or more programs or subprograms loaded from the storage or elsewhere that, when executed by processor 210, perform various procedures, operations, or processes consistent with the disclosed embodiments. For example, the memory may include one or more programs that enable access point 111 to, among other things, select, from among the two or more access points, a first access point to output a synchronization signal and output the synchronization signal from the first access point to the remaining one or more access points, wherein the synchronization signal may be used to synchronize data communication among the two or more access points.

Figure 3:
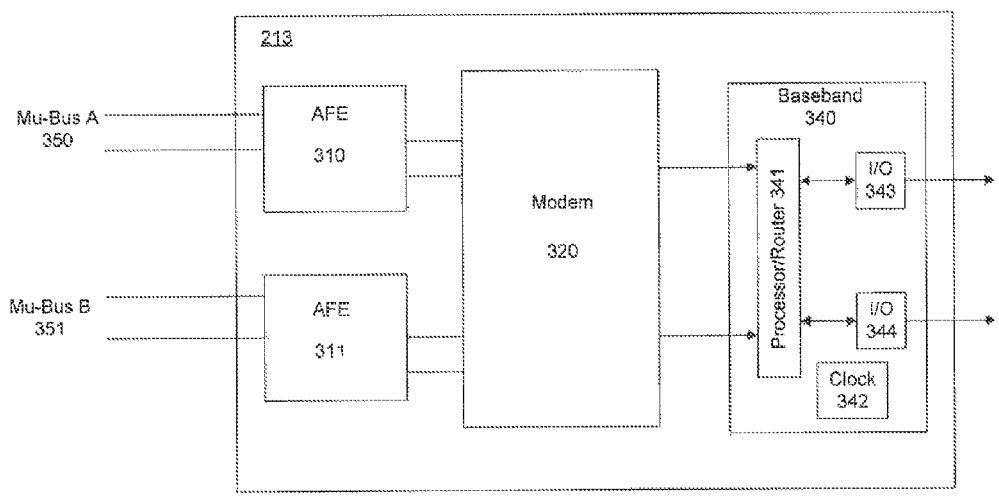
FIG. 3 is a pictorial illustration of an exemplary MU-Bus modem that may be included in the communication system of FIG. 2.

FIG. 3 is a pictorial illustration of exemplary components that may be included within MU-bus modern 213. As shown in FIG. 3, MU-bus modem 213 may include analog front ends (AFE) 310 and 311, modem 320, and baseband 340. AFE 310 is communicatively connected to MU-bus A 350, which is a pair of wires from MU-bus 140 (shown in FIG. 2), to receive and/or output data packets from data signals communicated over MU-bus A 350. AFE 311 is communicatively connected to MU-bus B 351, which is a second pair of wires from MU-bus 140 (shown in FIG. 2), to receive and/or output data packets from data signals communicated over MU-bus B 351. AFEs 310 and 311 may also be configured to condition received or outputted data signals according to one or more embodiments discussed below, e.g., by applying transmission spectrums to communication signals to account for communication channel characteristics, implementing one or more communication methods such as redundancy and/or multiple-input multiple-output methods discussed below, etc. AFEs 310 and 311 are communicatively connected to modem 320. Modem 320 may filter the data signal when sending and receiving the signal from AFE 310, 311 and baseband 340, The configuration of MU-bus modem 213 shown in FIG. 3 is exemplary and other configurations may be possible. For example, in another embodiment, MU-bus modem 213 may include a single APE communicatively connected to two modems within MU-bus modem 213.

Baseband 340 may include a processor/router 341, clock 342, and I/O ports 343 and 344 for communicating with other components within access point 111. Processor/router 341 may process the data signal before routing it to modem 320 or other components within access point 111. Additionally, clock 342 may be used by access point 111 to establish a synchronization signal with other access points when transmitting data signals.

Figure 4:
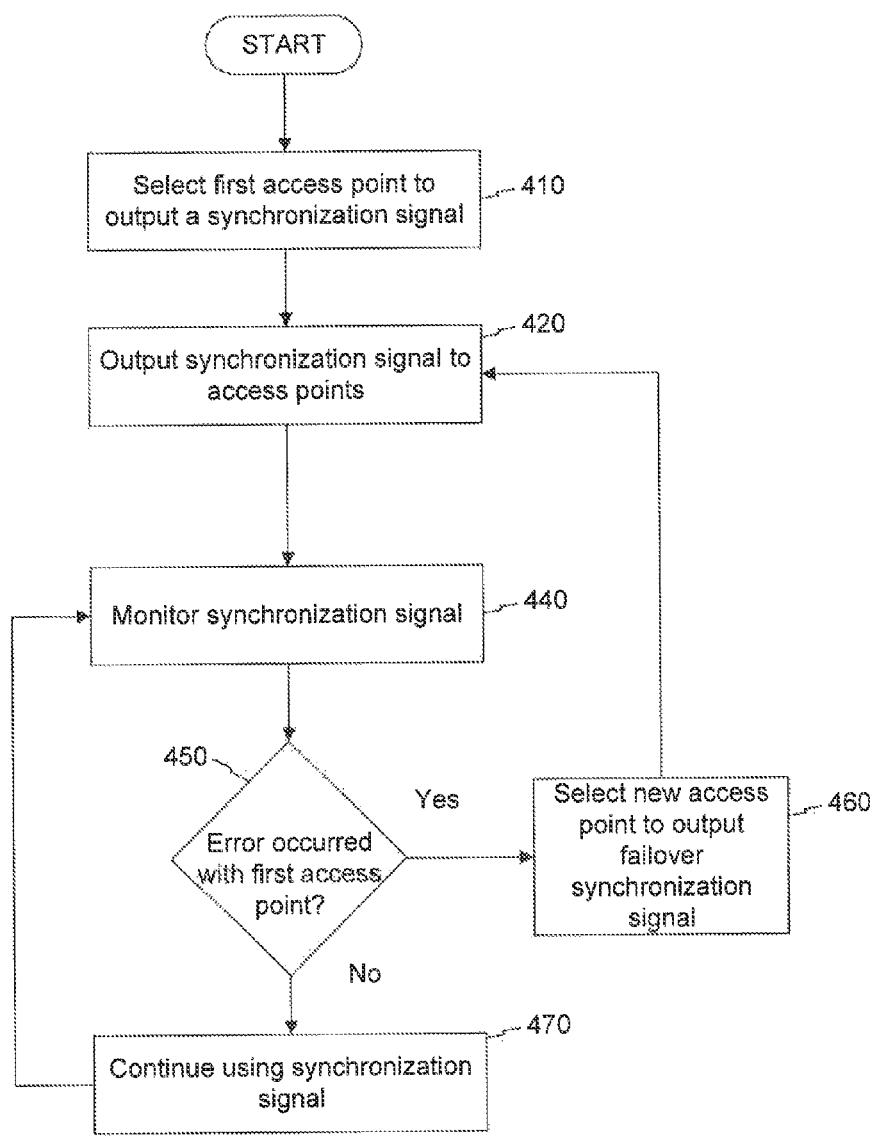
FIG. 4 is a flowchart depicting an exemplary disclosed method that may be performed by one or more components of the communication system shown in FIG. 1 to control data communication among a plurality of access points.

FIG. 4 is a flowchart illustrating an exemplary process of controlling data communication among a plurality of access points, such as access points 111, 121, and 131, in locomotive consist 100 using a synchronization signal. In the process of FIG. 4, a first access point from among the plurality of access points is selected to output a synchronization signal (Step 410). The synchronization signal is a signal that the access points used to synchronize the sending and receiving of data packets among each other. For example, the synchronization signal may be used to synchronize data communication between the first access point and a second access point. Likewise, the synchronization signal may be used to synchronize data communication between two or more access points that are separate from the first access point outputting the synchronization signal. The synchronization signal may also enable the plurality of access points to communicate using a frequency division multiple access (FDMA) communication scheme. In certain embodiments, the first access point may also determine bandwidth allocation for all of the access points within the communication network.

In certain embodiments, the first access point selected to output the synchronization signal may be pre-designated as a default to use its own on-board clock to create the synchronization signal. In another embodiment, the first access point may be selected based on the location of the access point within locomotive consist 100. For example, the first access point may be an access point in a locomotive located toward the middle of locomotive consist 100 (e.g., access point 121).

After selecting the first access point to output the synchronization signal (Step 410), the first access point initiates the start of a frame by outputting the synchronization signal to the remaining access points (Step 420). For example, the first access point may initiate the start of a frame by sending a beacon signal to the other access points, The beacon signal announces the beginning of a data communication period. The data communication period is a period during which data is communicated among the plurality of access points. In certain embodiments, the first access point may establish the start of a frame by using an internal clock at the first access point, such as clock 342 in MU-bus modem 213, as a master clock. Alternatively, the first access point may use another clock signal from a network device in communication with the first access point as the master clock to initiate the start of a communication frame.

Once the other access points receive the synchronization signal from the first access point, the receiving access points may use the synchronization signal to synchronize all data transmissions among access points within locomotive consist 100.

One or more of the access points (e.g., access points 111, 121, and 131) may monitor the synchronization signal output from the first access point to determine whether it is operating properly (Step 440). The first access point itself may monitor the synchronization signal and/or one or more of the receiving access points may monitor it. Referring to access point 111 as an example, processor 210 or processor/router 341 may be configured to monitor the synchronization signal and determine whether it is operating correctly as a master clock. In embodiments where one or more of the receiving access points are monitoring the synchronization signal, the receiving access point(s) may compare the synchronization signal to their own internal clock signal. For example, the receiving access point may compare the synchronization signal to the clock signal generated by its own clock 342 in MU-bus modem 213, or by any other clock.

Based on the monitoring step (Step 440), the access point(s) monitoring the synchronization signal determine whether an error bas occurred with the first access point outputting the synchronization signal (Step 450). If the access point(s) monitoring the synchronization signal determine that it has failed (Step 450, Yes), then a new access point from among the plurality of access points will be selected to output a failover synchronization signal to replace the original synchronization signal (Step 460). The process may then return to Step 420, where the new access point initiates the start of the frame using the failover synchronization signal. The process will then continue as described above.

If the access point(s) monitoring the synchronization signal determine that it has not failed (Step 450, No), then the first access point will continue to output the synchronization signal and the plurality of access points will continue using the synchronization signal to communicate data within the system (Step 470). In this case, the process will return to Step 440 and the access point(s) will continue to monitor the synchronization signal (Step 440). The process will then continue as described above.

Figure 5:
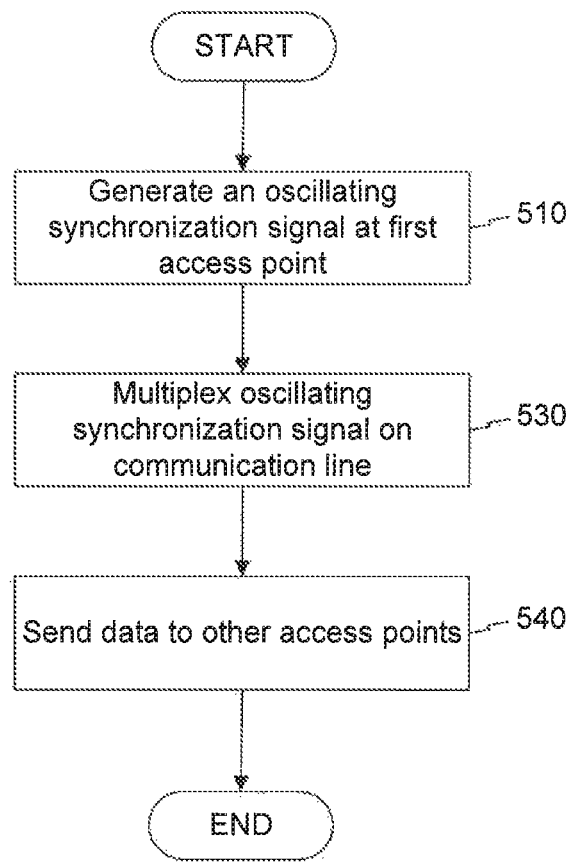
FIG. 5 is a flowchart depicting an exemplary disclosed method that may be performed by one or more components of the communication system shown in FIG. 1 to control data communication among a plurality of access points.

FIG. 5 illustrates a process of controlling data communication among a plurality of access points in a locomotive consist using an oscillating synchronization signal. The steps described in FIG. 5 may be performed, for example, as a part of Step 420 in the process of FIG. 4. For example, Step 510 in FIG. 5 may be performed after the first access point is selected to output a synchronization signal in Step 410 of FIG. 4. At Step 510, the first access point generates an oscillating synchronization signal. The oscillating synchronization signal may function as a clock signal for communicating data among a plurality of access points. In certain embodiments, the oscillating synchronization signal may oscillate at a specific frequency, such as 60 Hz, for example.

After generating the oscillating synchronization signal (Step 510), the first access point may multiplex the oscillating synchronization signal over a communication line that is communicatively coupled to the plurality of access points (Step 530). For example, the first access point may multiplex the oscillating synchronization signal over one or more wires included in MU-bus 140. By multiplexing the oscillating synchronization signal over the MU-bus, the first access point may impress a modulated carrier signal on the communication line. This modulated carrier signal allows for different frequency bands to be used on the communication line. Once the frequency bands are established, data communications between locomotives may be synchronized by using the established frequencies. The access point may also send data to other access points (Step 540). For example, the access point sends the data among the plurality of access points by using the clock signal established by the oscillating synchronization signal to allocate the data transmissions.

Figure 6:
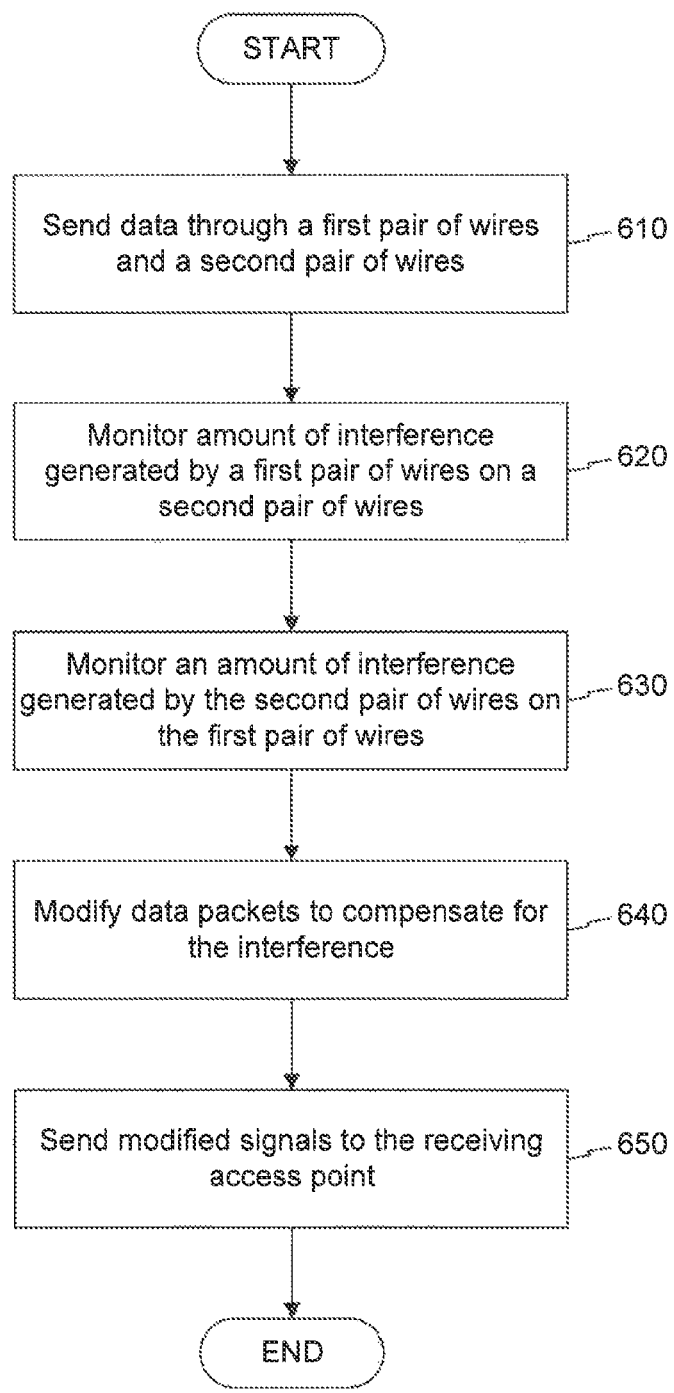
FIG. 6 is a flowchart depicting an exemplary disclosed method that may be performed by one or more components of the exemplary communication system shown in FIG. 1 to control data transmission within a locomotive consist by reducing interference on a communication line.

FIG. 6 illustrates a process for controlling data transmission within a locomotive consist by reducing the effect that interference on a communication line has on the data transmission. In the process of FIG. 6, a sending access point (e.g., access point 111) sends data to a receiving access point (e.g., access point 131) through a first pair of wires and a second pair of wires (Step 610). The first and second pair of wires communicatively connect the sending access point to the receiving access point. For example, the first and second pair of wires may be included in MU-bus 140. When sending the data transmission, the sending access point may divide the data packets included in the data transmission such that a first subset of the data packets are sent over the first pair of wires and a second subset of data packets are sent over the second pair of wires, for example using a multiple-input multiple-output (MIMO) communication technique.

The sending and/or receiving access point may also monitor an amount of interference generated by the first pair of wires on the second pair of wires when sending the data transmission from the sending access point to the receiving access point (Step 620). For example, the interference may include crosstalk between the first and second pair of wires. Additionally, the access point may monitor the effect the monitored interference has on the data transmission. The sending and/or receiving access point may also monitor an amount of interference generated by the second set of wires on the first set of wires (Step 630). For example, the access point may monitor the crosstalk between the second and first set of wires as well as the effect the crosstalk has on the data transmission.

Based on the monitored interference levels determined in Steps 620 and 630, the sending access point may modify data packets in subsequent data transmissions to compensate for the level of interference between the wires and thus eliminate any potential detrimental effects that the interference may have on the data transmission (Step 640). This may be achieved using several possible techniques such as, but not limited to, spatial multiplexing, Alamouti encoding, eigen-beamforming, etc. For example, before sending a subsequent data transmission, the sending access point may divide data packets included in the subsequent data transmission into a first subset of data packets to be sent on the first pair of wires and a second subset of data packets to be sent on the second pair of wires, similar to the process discussed above with regard to Step 610. Then, the sending access point may modify the first subset of the data packets based on the interference detected in Step 620 in order to compensate for the amount of interference generated by the first pair of wires on the second pair of wires. Likewise, the sending access point may modify the second subset of the data packets based on the interference detected in Step 630 in order to compensate for the amount of interference generated by the second pair of wires on the first pair of wires. The sending access point may modify the first and second subset of data packets using a bit loading technique and/or another packet modification technique. In certain embodiments, AFE 310 or AFE 311 may modify the packets in the manner described above.

After the sending access point modifies the data packets to compensate for the interference (Step 640), it may send the modified signals over the respective wires of MU-bus 140 to the receiving access point (Step 650). Upon receiving the modified signals from the sending access point, the receiving access point may organize the subsets of data packets according to the MIMO scheme being implemented in order to reconstruct the message being sent over MU-bus 140.

In certain embodiments discussed above with regard to FIG. 6, the first pair of wires and the second pair of wires may include four separate wires. That is, the first pair of wires may include a first wire and a second wire, and the second pair of wires may include a third wire and a fourth wire that are different than the first wire and the second wire. In other embodiments, however, the first pair of wires and the second pair of wires may share a common wire, such that there are only three wires between the two pairs of wires.

Figure 7:
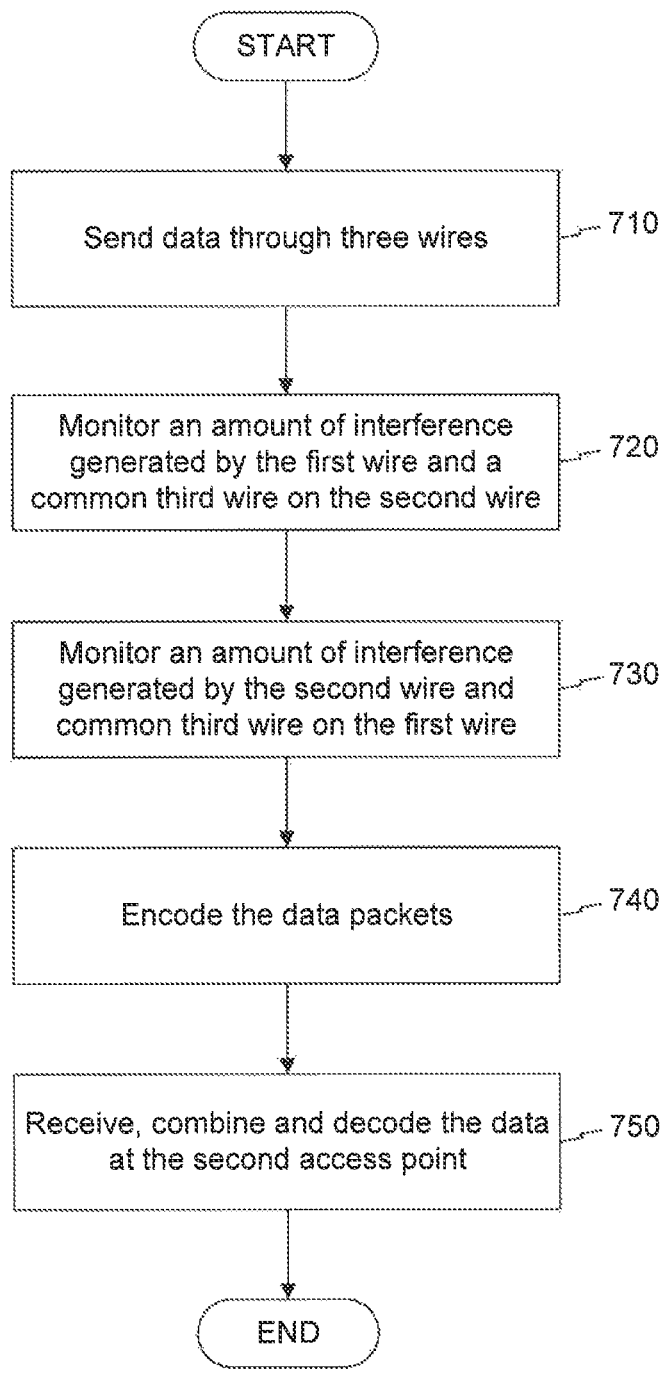
FIG. 7 is a flowchart depicting a second exemplary disclosed method that may be performed by one or more components of the exemplary communication system shown in FIG. 1 to control data transmission within a locomotive consist by reducing interference on a communication line.

The exemplary process illustrated in FIG. 7 may be used for controlling data transmission within a locomotive consist by reducing interference on the communication line when the first pair of wires and the second pair of wires share a common third wire. For example, the first pair of wires may include a first wire and the common third wire, while the second pair of wires may include a second wire and the common third wire. The sending access point may perform Step 710 of the process of FIG. 7 in a similar way to that described above with respect to Step 610 of FIG. 6, except that in Step 710 sending access point may send the data through the three wires that make up the first and second pair of wires, e.g., using a MIMO communication scheme.

The sending and/or receiving access point may also monitor an amount of interference generated by the first wire and the common third wire on the second wire when sending the data transmission from the second access point to the receiving access point (Step 720). For example, the interference may include crosstalk between the wires. The sending and/or receiving access point may also monitor an amount of interference generated by the second wire and common third wire on the first wire (Step 730). For example, the access point may monitor the crosstalk between the wires.

Based on the monitored interference levels determined in Steps 720 and 730, the sending access point may encode data packets in subsequent data transmissions to combine the signals carrying the data transmissions such that any potential detrimental effects of interference between the wires may be reduced (Step 740). Thus, similar to the description above with regard to Step 640 in FIG. 6, before sending a subsequent data transmission, the sending access point may divide data packets included in the subsequent data transmission into a first subset of data packets to be sent on the first pair of wires and a second subset of data packets to be sent on the second pair of wires. Then, in Step 740, the sending access point may encode the data to be sent along the three wires included in the first and second pairs of wires using an encoding scheme that eliminates any potential detrimental effects that the interference may have on the data transmission. In certain embodiments, AFE 310 and/or AFE 311 may be configured to encode the data in the manner described above.

After encoding the data packets, the sending access point sends the data packets to the receiving access point, which receives, combines and decodes the data according to the encoding scheme employed at the sending access point (Step 750). In various embodiments, the decoding may be performed by processor 210, processor/router 341, AFE 310, and/or AFE 311.

FIGS. 6 and 7 discussed above describe communication methods by which access points 111, 121, and 131 within locomotive consist 100 may communicate with each other using MIMO and/or MIMO-related communication techniques, e.g., by dividing data packets representing a data communication into subsets and sending the different subsets across wires of MU-bus 140, and also describe how the access points may modify and/or encode data packets to reduce interference between the wires. Access points 111, 121, and 131 may also communicate using other communication methods. For example, in certain embodiments, the sending access point may send redundant data packets across multiple wires. In these embodiments, the sending access point may receive a communication to be sent to the receiving access point. The sending access point may send a first set of data packets representing the communication along a first set of wires and may also send a second set of data packets representing the same communication along a second set of wires. In certain embodiments, this type of redundant communication may be used, for example, if a channel between the sending and receiving access points has a low signal-to-noise ratio (SNR), is experiencing an undesired amount of cross talk and/or packet loss, etc.

Figure 8:
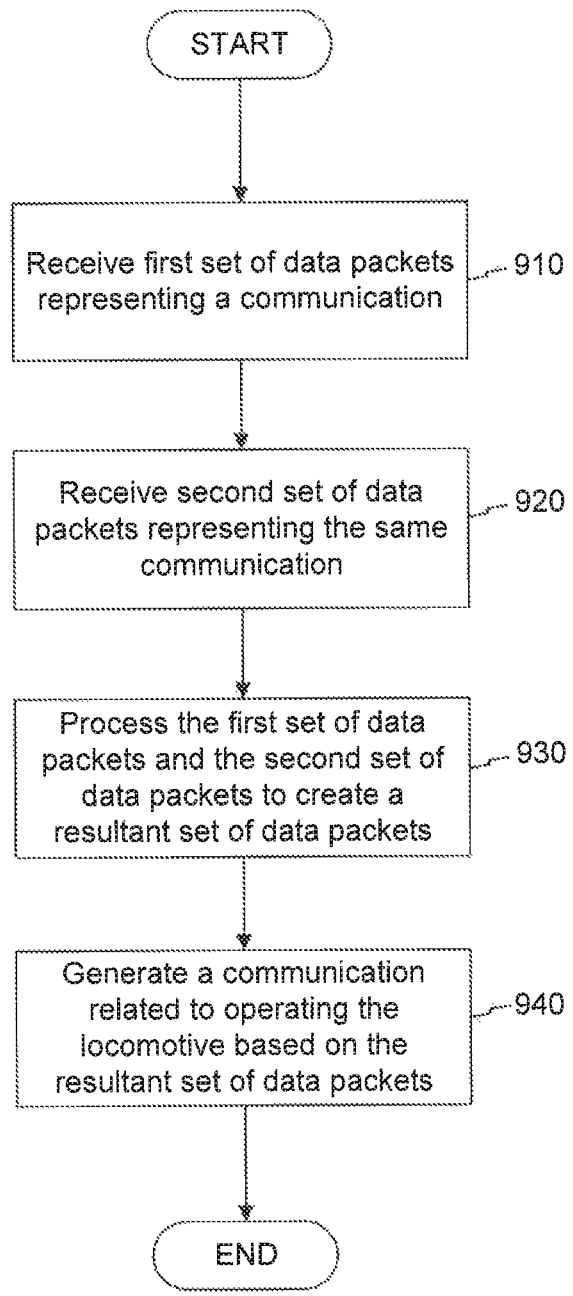
FIG. 8 is a flowchart depicting a second exemplary disclosed method that may be performed by one or more components of the exemplary communication system shown in FIG. 1 to process received data packets.

FIG. 8 is a flowchart of an exemplary process that may be performed by the receiving access point (e.g., access point 131) when receiving data communicated according to the redundant communication method discussed above. For example, the receiving access point may receive a first set of data packets representing a communication on a first pair of wires of MU-bus 140 (Step 910), and may also receive a second set of data packets representing the same communication on a second pair of wires of MU-bus 140 (Step 920). The receiving access point may receive the sets of data packets in MU-bus Modem 213 and may route the data to processor 210 through AFE 310, Baseband 340, and router & bridge 212, for example.

Moreover, while the data packets sent by the sending access point may have been identical when they were sent, different channel characteristics, such as SNR, interference, etc., may cause the received data packets to differ by the time they reach the receiving access point Thus, the receiving access point may process the first set of data packets and the second set of data packets to create a resultant set of data packets representing the communication (Step 930). For example, receiving access point may add together corresponding bits of the first set of data packets and the second set of data packets to create the resultant set of data packets. If the receiving access point adds together corresponding bits of the data packets, then the receiving access point may determine the value of each bit within the resultant set of data packets by comparing the sum of the corresponding bits to a threshold value. In certain embodiments, this threshold value may be 1, although the receiving access point may vary the threshold based on external factors such as system packet loss and throughput. Adding the bits of the data packets together reduce the effects of packet loss on the wires over which the communications are sent. In another embodiment, the receiving access point may select one of the first set of data packets or the second set of data packets based on a determined amount of packet loss or other characteristic associated with each of the first set of data packets and the second set of data packets. Thus, in this embodiment, the receiving access point may use the data transmitted over one of the pairs of lines and discard the data transmitted over the other pair of lines.

After creating the resultant set of data packets, the receiving access point may generate a communication related to operating the locomotive based on the communication represented by the resultant set of data packets (Step 940). For example, the communication may include a command to control one or more components of locomotive 130, such as one or more sensors or actuators, for example. This way, access points within locomotive consist 100 can successfully communicate to facilitate the control of locomotives 110, 120, and 130 within locomotive consist 100 even when communication channels between the locomotives exhibit high levels of interference. Alternatively or additionally, the communication may include a local area network communication, a video and/or audio transmission or another communication function.

Figure 9:
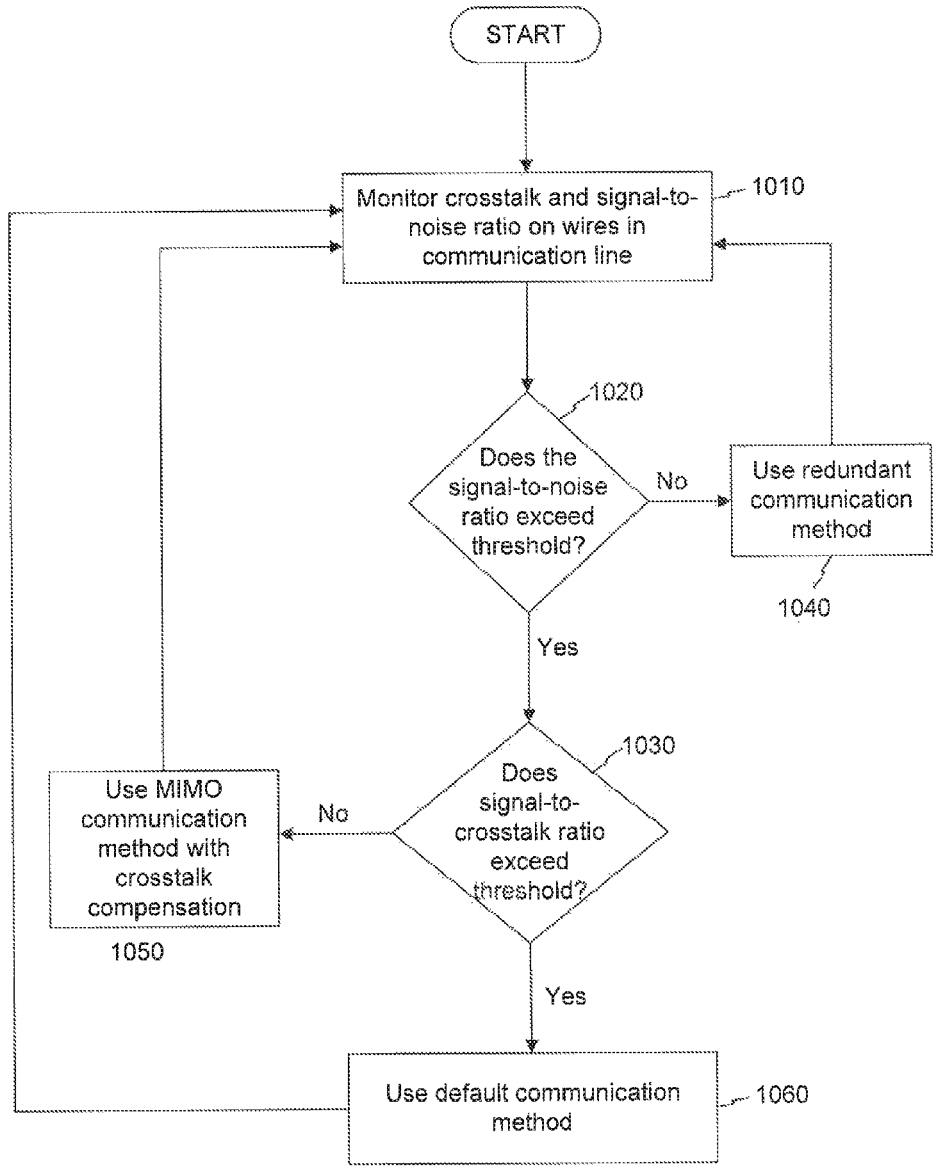
FIG. 9 is a flowchart depicting an exemplary disclosed method that may be performed by one or more components of the exemplary communication system shown in FIG. 1 to determine the best data transmission method for successfully transmitting data on a communication line.

FIG. 9 illustrates a process fur determining which communication method to use for transmitting data between access points over a communication line such as MU-bus 140. For example, as described below, the process of FIG. 9 may include monitoring at least one of the first pair of wires and one of the second pair of wires for interference and selectively determining a communication method to be used between the sending access point and the receiving access point based on the monitored interference. Monitoring the interference may include, for example, determining values representative of the SNR and/or crosstalk associated with the wires.

In the process of FIG. 9, the sending and/or receiving access point monitors crosstalk and SNR on the wires in the communication line such as MU-bus 140 (Step 1010). Alternatively, the access point monitoring the crosstalk and SNR may be any other access point within the locomotive consist 100.

The monitoring access point may also determine if the SNR exceeds a threshold value (Step 1020). The threshold value may be set to a predetermined value in order to optimize data transmission, If the SNR does not exceed the threshold value (Step 1020, Yes), then the data will be transmitted using the redundant communication method described with regard to FIG. 8. For example, the receiving access point may generate a request for the sending access point to send a subsequent communication using the redundant communication method of FIG. 8 (Step 1040). The process may then return to Step 1010 where the channels are again monitored to determine the best communication method for subsequent communications.

If the SNR exceeds the threshold value (Step 1020, Yes), then the monitoring access point may determine if the signal-to-crosstalk ratio associated with one or more of the wires exceeds a signal-to-crosstalk ratio threshold value (Step 1030). The signal-to-crosstalk threshold value may also be a predetermined value selected to optimize data transmission. If the monitored signal-crosstalk does not exceed the signal-to-crosstalk threshold value (Step 1030, No), then subsequent data transmissions may be sent between the sending and receiving access points using a MIMO communication method that includes a crosstalk or interference compensation scheme (Step 1050), such as one of the methods describe above with regard to FIGS. 6 and 7. For example, the receiving access point may generate a request for the sending access point to send a subsequent communication using one of the methods described above with regard to FIGS. 6 and 7. Alternatively, the MIMO communication method may be implemented by a plurality of single input/single output (SISO) devices that may be combined to provide MIMO functionality, For example, the access point may multiplex data packets over two pairs of wires without further modification. Then, a receiving access point may further process the data packets to reduce and/or cancel any crosstalk.

If at Step 1030, the monitored signal-to-crosstalk does exceed the signal-to-crosstalk threshold (Step 1030, Yes), then the access point will transmit and receive data using a default communication method (Step 1060). For example, the receiving access point may generate a request for the sending access point to send a subsequent communication using a default communication method. In certain embodiments, the default mechanism may include MIMO without crosstalk compensation. In other embodiments, the default mechanism may include sending data packets along a single pair of wires without any modification.

Figure 10:
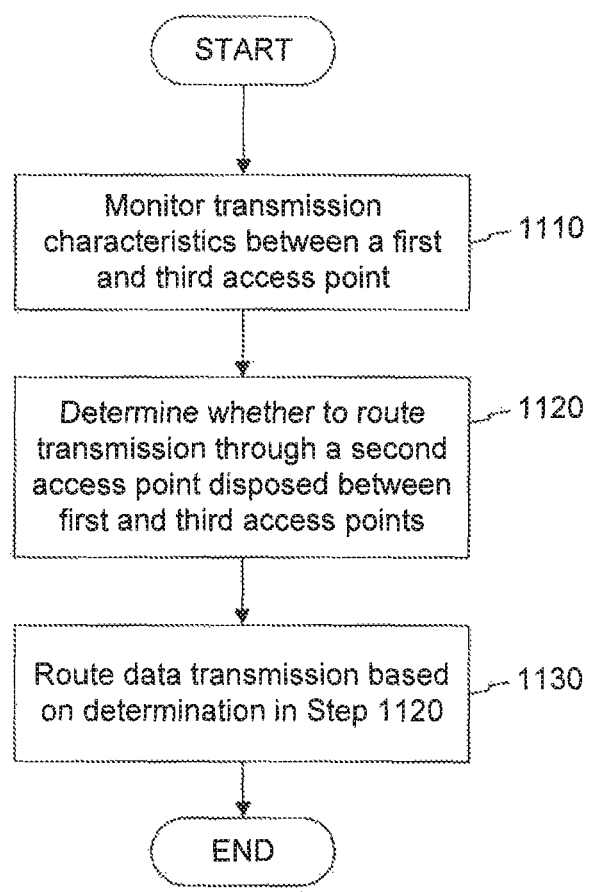
FIG. 10 is a flowchart depicting an exemplary disclosed method that may be performed by one or more components of the exemplary communication system shown in FIG. 1 to determine a route for transmitting the data on a communication line.

FIG. 10 illustrates a process for determining a route for transmitting the data between access points on a communication line such as MU-bus 140, In the process of FIG. 10, a first access point (e.g., access point 111) monitors at least one characteristic of a data transmission between access point 111 and a third access point (e.g., access point 131) (Step 1110). As shown in FIG. 1, a second access point (e.g., access point 121) may be physically disposed between access point 111 and access point 131 on the communication line. Additionally, a fourth access point (not shown in FIG. 1) may be disposed between access point 111 and access point 121 or between access point 121 and access point 131. The monitored transmission characteristics being monitored by access point 111 may include packet loss and throughput. While access point 111 is being used as an example, any other access point on MU-bus 140 may monitor the characteristics of data transmissions.

Based on the monitored transmission characteristics in Step 1110, the first access point may determine whether to route the data transmission through the second access point disposed between the first and second access point (Step 1120). The access point may then route the data transmission based on the determination made in Step 1120 (Step 1130).

For example, access point 111 may determine that the monitored packet loss and/or throughput exceeds a threshold, and, in response, may determine to route the data transmission from access point 111 to access point 131 through access point 121. Based on this determination, access point 111 will send the data transmission to access point 121. Upon receiving the data transmission from access point 111, access point 121 may send the data transmission immediately to access point 131. Alternatively, access point 121 may wait to transmit the data to access point 131 until a communication line is available to send the data. If a transmission line is not immediately available, access point 121 may store the data transmission in a buffer or memory (e.g., memory 217). Once a communication line is available, access point 121 may send the data transmission to access point 131. While this data transmission routing may result in a certain amount of latency between the data transmission from access point 111 to access point 121 and the data transmission from access point 121 to access point 131, it may also result in decreased packet loss when compared to a data transmission that is routed directly from access point 111 to access point 121 without being routed through access point 121. The decreased packet loss may ensure higher data transfer reliability and faster overall data transmission. For example, by selectively routing the data transmission through access point 121, only a single data transmission attempt may be needed. On the other hand, routing directly from access point 111 to access point 131 may result in so much packet loss that two or more data transmission attempts may be required before the data is successfully transmitted from access point 111 to access point 131.

On the other hand, if the monitored data transmission's packet loss and/or throughput is within an acceptable level, then access point 111 may route the data transmission from access point 111 directly to access point 131. In this case, access point 111 may send the data packet directly to access point 131 without sending it to access point 121, in circumstances where the packet loss and/or throughput is within an acceptable level, direct routing may result in a faster data transmission from access point 111 to access point 131, because the data transmission is not delayed by access point 121.

The disclosed system may also determine how to route these transmissions by monitoring and comparing the characteristics of two or more data transmissions between different access points. For example, one or more access points may monitor and compare the characteristics of a data transmission from access point 111 to access point 121 and then to access point 131 with the characteristics of a data transmission directly from access point 111 to access point 131. Based on this comparison, the one or more access points may make a determination on the future routing of data transmissions. For example, access point 111 may determine that the net packet loss associated with the data transmission routed through access point 121 is less than the net packet loss associated with the data transmission routed directly from access point 111 to access point 131. Responsive to this determination, access point 111 may route future data transmissions to access point 131 through access point 121 to reduce packet loss. Those skilled in the art will appreciate that access point 111 may make similar routing decisions based on other data transmission characteristics, such as throughput. For example, access point 111 may determine that the throughput associated with the data transmission routed through access point 121 is greater than the throughput associated with the data transmission routed directly from access point 111 to access point 131. Responsive to this determination, access point 111 may route future data transmissions to access point 131 through access point 121 to increase throughput. Moreover, access point 111 may also make these routing decisions based on optimizing a combination of data transmission characteristics, e.g., using moving averages, weighted moving averages, etc.

While the examples described above with reference to FIG. 10 have involved three access points, those skilled in the art will appreciate that the principles can be applied to locomotive consists having any number of access points. For example, as discussed above, a fourth access point, while not shown in FIG. 1, may be disposed between access point 111 and access point 121 or between access point 121 and access point 131, e.g., in an additional locomotive within locomotive consist 100 (also not shown). In this example, access point 111 may determine, based on monitored characteristics of one or more data transmissions, whether to route the data transmission through the fourth access point, in addition to or instead of routing the data transmission through access point 121. In certain circumstances, such as where data transmissions between access point 111 and access point 131 exhibit unsatisfactory levels of packet loss, access point 111 may route a data transmission through both access point 121 and the fourth access point in order to reach access point 131.

Figure 11:
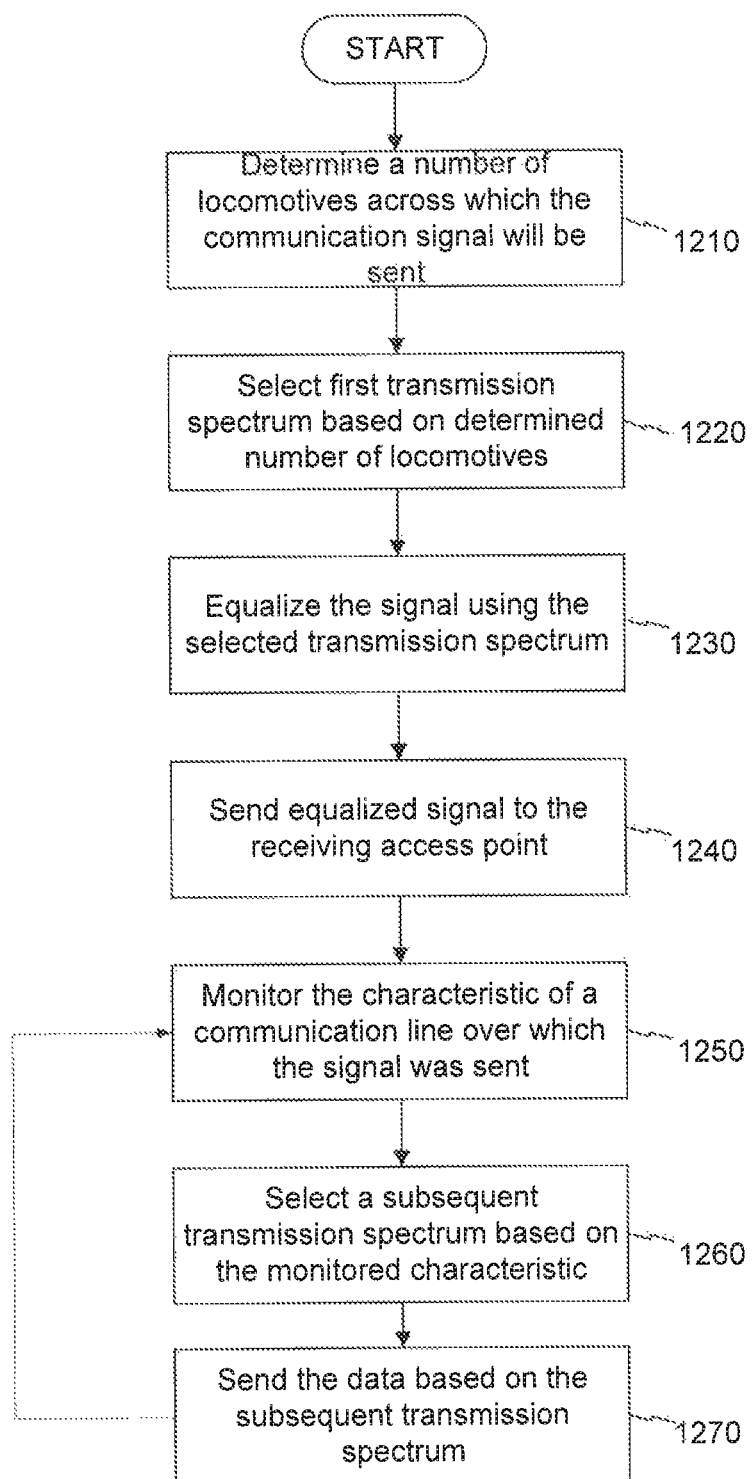
FIG. 11 is a flowchart depicting an exemplary disclosed method that may be performed by one or more components of the exemplary communication system shown in FIG. 1 to determine a transmission spectrum for transmitting data on a communication line.

FIG. 11 illustrates a process for determining a transmission spectrum for transmitting a communication carrying data over a communication line such as MU-bus 140. In the process of FIG. 11, a first access point (e.g., access point 111) determines the number of locomotives across which the communication signal will be sent (Step 1210). For example, as shown in FIG. 1, the access point 111 may determine that a communication signal being sent to a second access point access point 131), may be sent across three locomotives (e.g., locomotives 110, 120, and 130).

Based on the determined number of locomotives, access point 111 may select a first transmission spectrum (Step 1220). For example, access point 111 may include, e.g., in memory 217 or elsewhere, one or more lookup tables that correlate different numbers of locomotives each with a first transmission spectrum. The transmission spectrum may define a pre-equalization of a waveform or may alter a bandwidth over which the communication signal is transmitted. Access point 111 may equalize the communication signal using the selected transmission spectrum (Step 1230). For example, the transmission spectrum may be a waveform that equalizes a communication signal by altering the signal's gain peak. Alternatively, the transmission spectrum may alter the bandwidth of the communication signal by either widening or narrowing the bandwidth. In certain embodiments, the transmission spectrum may change the spectral density to redistribute power over the bandwidth. Once access point 111 has equalized the communication signal, it may send the equalized signal to access point 131 (Step 1240).

Access point 111 may also monitor characteristics of the communication line over which the signal was sent (Step 1250). For example, access point 111 may monitor the communication line to ensure that the communication signal is properly transmitted. Additionally, access point 111 may monitor the communication line for other characteristics that may impact the quality of the data transmission, such as the SNR, packet error rate, and received signal levels on the communication line.

Based on the monitored characteristic, access point 111 may select a subsequent transmission spectrum for subsequent communication signals transmitted along the same path (e.g., to the same receiving access point) (Step 1260). In certain embodiments, the lookup table stored at access point 111 may correlate both the number of locomotives and a monitored characteristic, such SNR, with different transmission spectra. Thus, based on the number of locomotives determined in Step 1220 and the characteristic monitored at Step 1250, access point 111 may determine, with reference to the lookup table, the subsequent transmission spectra to be used for a subsequent communication signal. Additionally, access point 111 may dynamically generate a new transmission spectrum based on the monitored characteristics. For example, instead of selecting a predetermined transmission spectrum from the lookup table, access point 111 may generate a new transmission spectrum that may include a plurality of sub-carriers within an orthogonal frequency-division multiplexing (OFDM) signal that are customized based on the monitored characteristics of the channel. After creating the new transmission spectrum, access point 111 may store it, e.g., in storage 216 or memory 217, to be used for subsequent transmissions. In certain embodiments, access point 111 may store the dynamically created transmission spectrum in the lookup table. Once the subsequent transmission is selected (or created), access point 111 may send the communication signal to access point 131 based on the subsequent transmission spectrum (Step 1270). After sending the communication signal, access point 111 may continue to monitor the characteristic of the communication line over which the signal has been sent (Step 1250). By continuing to monitor the communication line, access point III may continue to adjust the data signal to account for any new environmental factors that may change over time. This way, access point 111 may ensure that data transmissions are successfully received by access point 131 by adjusting the communication signal to account for any changes in the environment surrounding locomotive consist 100.

Industrial Applicability

Methods and systems consistent with features related to the disclosed embodiments enable more reliable data transmissions between locomotives within a locomotive consist, even when the channel between the locomotives becomes degraded due to various factors, such as environmental factors, crosstalk, other interference, etc. The methods and systems may also monitor the data transmissions within the consist and adjust a data transmission method in order to reduce interference caused by the wires, That is, methods and systems consistent with disclosed embodiments may modify the data packets and encode the data before sending the transmission to compensate for any interference that would otherwise affect the data transmission. Thus, methods and systems consistent with disclosed embodiments may not only reduce interference, but may also optimize data transmissions by constantly monitoring and adapting to environmental factors.

Moreover, while several embodiments have been described herein, those skilled in the art will appreciate that one or more disclosed embodiments may be combined with one or more other disclosed embodiment. For example, in addition to adjusting data transmissions to reduce interference caused by wires on the communication lines, the system may also selectively route the data, e.g., through an intermediate locomotive, in order to improve data transmission performance, Still further, any combination of the embodiments discussed above may be combined in any manner.

It will be apparent to those skilled in the art that various modifications and variations can be made to the disclosed locomotive consist communication system. Other embodiments will be apparent to those skilled in the art from consideration of the specification and practice of the disclosed locomotive consist communication system. It is intended that the specification and examples be considered as exemplary only, with a true scope being indicated by the following claims and their equivalents.

What is claimed is:

1. A system for communicating data in a locomotive consist, comprising:
    one or more memories storing one or more instructions; and
    one or more processors configured to execute the instructions to:
        monitor an effect of a first interference generated by a first pair of wires on a second pair of wires during communication between a first access point and a second access point;
        monitor an effect of a second interference generated by the second pair of wires on the first pair of wires during the communication between the first access point and the second access point;
        monitor one or more characteristics of the communication between the first access point and the second access point;
        divide data packets to be sent from the first access point to the second access point such that a first subset of the data packets are designated for the first pair of wires and a second subset of the data packets are designated for the second pair of wires; and
        modify the first subset of the data packets to reduce the effect of the first interference, wherein the modifying includes dynamically generating a new transmission spectrum based on the one or more monitored characteristics.

2. The system of claim 1, wherein the one or more processors are further configured to execute the instructions to modify the second subset of the data packets to reduce the effect of the second interference.

3. The system of claim 2, wherein the one or more processors are further configured to execute the instructions to send the modified first subset of the data packets on the first pair of wires and the modified second subset of the data packets on the second pair of wires.

4. The system of claim 3, wherein the first interference and the second interference include crosstalk between the pairs of wires.

5. The system of claim 3, wherein the first pair of wires includes a first wire and a second wire and the second pair of wires includes a third wire and the second wire such that the second wire is shared among the first pair of wires and the second pair of wires.

6. The system of claim 5, wherein the one or more processors are further configured to:
monitor the effect of the first interference by monitoring the interference generated by the first wire and the second wire on the third wire, and
monitor the effect of the second interference on a second pair of wires by monitoring the interference generated by the second wire and the third wire on the first wire.

7. The system of claim 3, wherein the first pair of wires includes a first wire and a second wire and the second pair of wires includes a third wire and a fourth wire that are different than the first wire and the second wire.

8. The system of claim 3, wherein modifying the first subset of the data packets and the second subset of the data packets includes encoding the first subset of the data packets and the second subset of the data packets based on the first interference and the second interference.

9. The system of claim 8, wherein the one or more processors are further configured to execute the instructions to:
receive the modified first data packets and the modified second data packets at the second access point; and
decode the modified first data packets and the modified second data packets at the second access point.

10. A method for controlling data communication within a locomotive consist, the method comprising:
monitoring an effect of a first interference generated by a first pair of wires on a second pair of wires during communication between a first access point and a second access point;
monitoring an effect of a second interference generated by the second pair of wires on the first pair of wires during the communication between the first access point and the second access point;
monitoring one or more characteristics of the communication between the first access point and the second access point;
dividing data packets to be sent from the first access point to the second access point such that a first subset of the data packets are designated for the first pair of wires and a second subset of the data packets are designated for the second pair of wires; and
modifying the first subset of the data packets to reduce the effect of the first interference, wherein the modifying includes dynamically generating a new transmission spectrum based on the one or more monitored characteristics.

11. The method of claim 10, further including modifying the second subset of the data packets to reduce the effect of the second interference.

12. The method of claim 11, further including sending the modified first subset of the data packets on the first pair of wires and the modified second subset of the data packets on the second pair of wires.

13. The method of claim 12, wherein the first interference and the second interference include crosstalk between the pairs of wires.

14. The method of claim 12, wherein the first pair of wires includes a first wire and a second wire and the second pair of wires includes a third wire and the second wire such that the second wire is shared among the first pair of wires and the second pair of wires.

15. The method of claim 14, wherein:
monitoring the effect of the first interference includes monitoring the interference generated by the first wire and the second wire on the third wire, and
monitoring the effect of the second interference includes monitoring the interference generated by the second wire and the third wire on the first wire.

16. The method of claim 12, wherein the first pair of wires includes a first wire and a second wire and the second pair of wires includes a third wire and a fourth wire that are different than the first wire and the second wire.

17. The method of claim 12, wherein modifying the first subset of the data packets and the second subset of the data packets includes encoding the first subset of the data packets and the second set of data packets based on the effect of the first interference and the second interference.

18. The method of claim 17, further including:
receiving the modified first data packets and the modified second data packets at the second access point; and
decoding the modified first data packets and the modified second data packets at the second access point.

19. A locomotive consist, comprising:
a plurality of locomotives;
a communications network; and
a plurality of access points disposed within locomotives of the locomotive consist and communicatively coupled to the communications network, wherein a first access point of the plurality of access points is configured to:
monitor an effect of a first interference generated by a first pair of wires on a second pair of wires during communication between the first access point and a second access point;
monitor an effect of a second interference generated by the second pair of wires on the first pair of wires during the communication between the first access point and the second access point;
monitor one or more characteristics of the communication between the first access point and the second access point;
divide data packets to be sent from the first access point to the second access point such that a first subset of the data packets are designated for the first pair of wires and a second subset of the data packets are designated for the second pair of wires; and
modify the first subset of the data packets to reduce the effect of the first interference, wherein the modifying includes dynamically generating a new transmission spectrum based on the one or more monitored characteristics.

20. The locomotive consist of claim 19, wherein the first access point is further configured to:
send the modified first subset of the data packets on the first pair of wires and the modified second subset of the data packets on the second pair of wires; and
modify the second subset of the data packets to reduce the effect of the second interference.

* * * * *